Sept. 3, 1968     W. J. AMBROSE     3,399,909

TRANSMITTING APPARATUS

Filed Feb. 17, 1966     2 Sheets-Sheet 1

INVENTOR.
WILLIAM J. AMBROSE

BY
*John Shaw Stevenson*
AGENT.

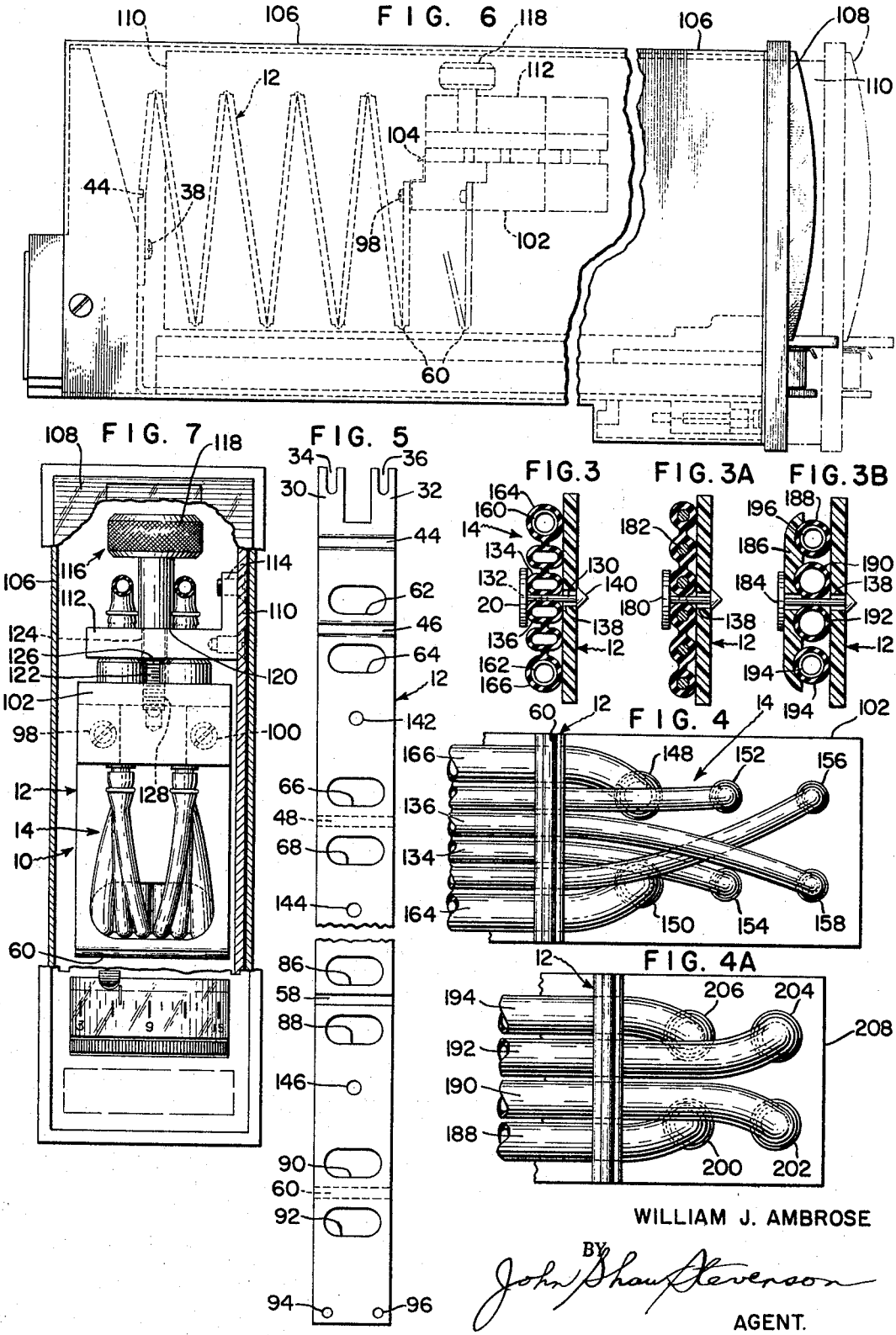

United States Patent Office 3,399,909
Patented Sept. 3, 1968

3,399,909
TRANSMITTING APPARATUS
William J. Ambrose, Springfield, Pa., assignor to Honeywell Inc., Minneapolis, Minn., a corporation of Delaware
Filed Feb. 17, 1966, Ser. No. 528,245
10 Claims. (Cl. 285—61)

ABSTRACT OF THE DISCLOSURE

A non-crimpable, flexible, drawbridge type connector to interconnect two relatively moving parts e.g. an instrument and a casing in which the instrument is mounted; a truck and a trailer wherein an extensible resilient member and a jumper type fluid and/or electrical type transmission lines that extend along and are interwoven through apertures positioned along the length of the resilient member are retained in a firm position thereto by means of snap-on retainers to provide rapid connection and disconnection of the transmission lines to the resilient member.

---

It is the object of the present invention to disclose a flexible connector.

One of the problems that has heretofore been left unresolved when extensible type transmission lines have been used as a jumper between two relatively movable parts has been the undesired crimping action that takes place in the looped portions of these lines when their ends are moved toward and away from one another.

One attempt that has heretofore been made in a search to find a solution to this problem has been to provide a clamping member that restricts the movement of each of the looped portions while the remaining non-looped portions of these lines are being moved to an extended position. The suggestion of restricting the looped portions in this fashion has not solved the problem because it results in greater stretching and crimping of the portion of the line that is adjacent each of the restricted loop portions while the ends of these lines are moved toward and away from one another.

It is thus an object of the present invention to disclose a flexible connector comprised of an extensible resilient member, jumper type transmission lines extending along the length of the resilient member and a clip means uniquely constructed for rapid connection and disconnection of the transmission lines to the resilient member which will not introduce any adverse stretching or crimping in the lines when the ends of the lines are moved toward and away from one another.

It is another object to disclose a flexible connector having as one of its component parts a resilient member which is of an unique multidrawbridge configuration that can be beneficially positioned as an extensible connection between two relatively movable parts.

It is another object to disclose the aforementioned resilient part of the connector as being made of a long lasting flexible plastic material, such as a material known in trade as "polypropylene," that contains spaced apart slot and hinge portions.

It is a salient object of the invention to provide a flexible connector with snap-on retaining clips as another of its component parts to hold non-looped portions of pneumatic, liquid and/or other transmitting lines such as a bank of wires, securely in a fixed position against the resilient part, to enable folding and unfolding to take place in a multi-drawbridge fashion by the motion of the two relatively movable parts to which the ends of the connectors are attached.

It is another object to disclose a unique resilient part and snap-on retaining clips that will maintain the internal transmitting characteristics of the transmitting lines in a desired non-crimp condition while the lines are moved between compact and extensible positions.

It is another object of the invention to provide a coiled wire that is positioned within and which extends through one or more of the aforementioned bank of flexible pneumatic tubes as another one of the common parts of the flexible connector.

It is another more specific object of the invention to disclose a plug and socket unit for rapidly connecting and/or disconnecting the inlet and outlet ends of the transmitting lines of the aforementioned flexible connector to a portion associated with each of the relatively movable parts of an instrument such as a casing and pull-out front end portion, or to the portions positioned adjacent the parts of a truck-trailer or to two adjacent railway car parts that are connected by means of a swivel or coupling.

A better understanding of the present invention may be had from the following detailed description when read in connection with the accompanying drawings in which:

FIGURE 3 is a section taken along the line 3—3 of FIGURE 2 to show how each of the snap-on button retaining members shown in FIGURE 2 are employed to retain a series of, e.g. six integrally molded pneumatic transmitting lines to the resilient member;

FIGURE 3A is a section similar to FIGURE 3, but shows how integrally molded electrical conductor transmitting lines in lieu of pneumatic lines can be mounted on the resilient member;

FIGURE 3B is a section similar to FIGURE 3, and shows an alternative type of snap-on button and clip that can be substituted for the snap-on button shown in FIG. 3 to connect a series, e.g. of four separate transmitting lines to the resilient member;

FIGURE 4 is a bottom view of the aforementioned six transmitting lines shown at the right end of FIGURE 1;

FIGURE 4A is a view similar to FIGURE 4 to show a movable end connection when only four separate transmitting lines are employed in lieu of six;

FIGURE 5 is a plan view of the resilient member to which the transmitting lines are retained by snap-on retaining clips as shown on the previously described figures;

FIGURE 6 is a view showing in dotted line form the position the right end of the resilient multi-drawbridge member is in when compressed to a folded condition within an instrument case and further shows in phantom line form the position that the right end of the resilient member will be in when the movable inner and front end of the instrument is moved away from the instrument case to any one of a number of positions such as is indicated by its dotted line position;

FIGURE 7 is a right end view of FIG. 6 showing how the movable body of the poppet valve is connected to the removable end of the instrument.

Figure 2:
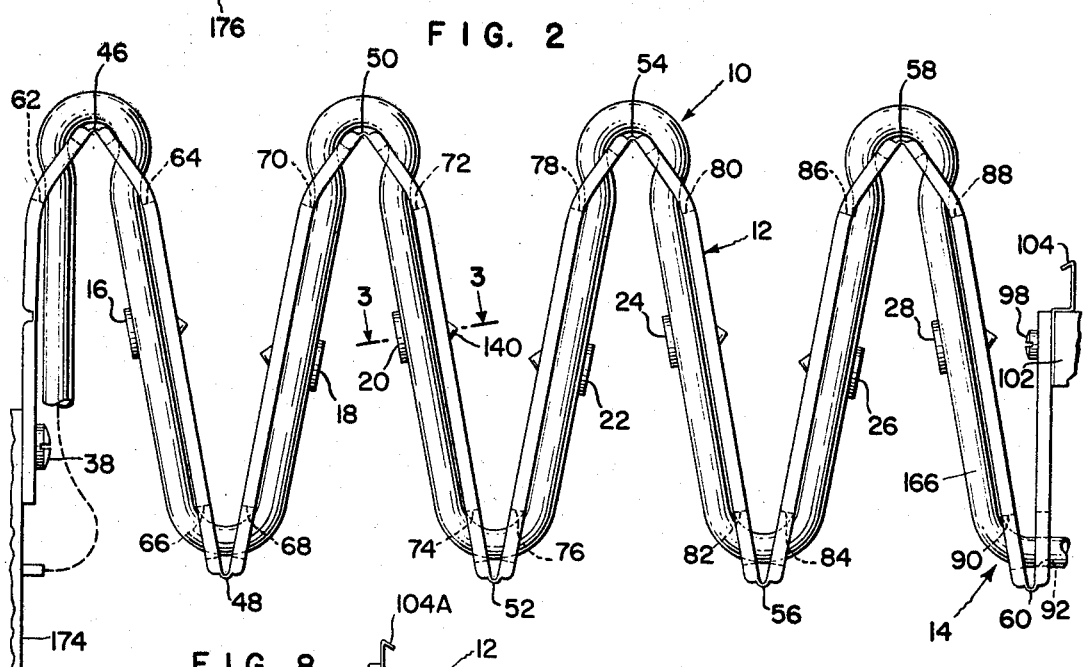
FIGURE 2 shows the aforementioned resilient member and transmitting mediums retained thereon in a partially expanded condition.
Figure 8:
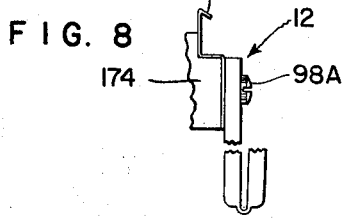

FIGURE 8 shows a plain view of a modified form of a flexible connector for the left end of the connector shown in FIGURE 2 to indicate how the left end of the connector can be provided with a terminal block and hook attachment so that both ends of the connector shown in FIG. 2 can be simultaneously moved away or toward one another for connection to any two different relatively spaced apart members.

Figure 1:
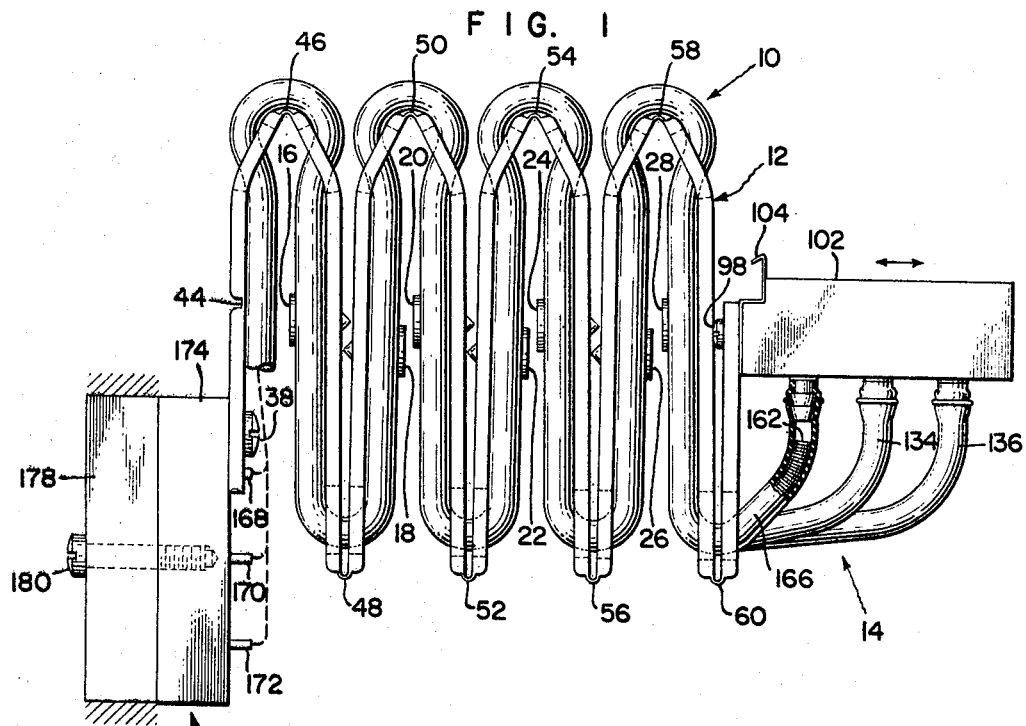
FIGURE 1 shows the resilient member fixedly connected at one end to a stationary member and its opposite movable end positioned so that the multi-drawbridge parts between these ends and the transmitting mediums uniquely retained thereon are folded into compact relationship with one another.

The flexible connector 10, shown in FIGURE 1, is comprised of a resilient member 12, transmitting lines 14, extending along the resilient member 12 and a series of spaced apart snap-on retaining clips 16–28 to fixedly secure the non-looped portions of these lines 14 to the resilient member 12.

The resilient member 12 is as best shown in FIGURES 1, 2 and 5 made of a long lasting flexible plastic material that is referred to in the trade as "Polypropylene."

The left end of resilient member 12 is provided with two extensible portions 30, 32 that contain associated slots 34, 36. A suitable connecting means such as the screw 38 and another screw, not shown, are employed to threadedly connect the left end of the member 12 to a stationary member, such as the stationary part of instrument 42.

A plurality of grooved out portions 44–60, are shown formed in spaced apart portions of resilient member 12 to thereby provide this member with a series of spaced apart hinges.

Pairs of spaced apart apertures 62, 64; 66, 68; 70, 72; 74, 76; 78, 80; 82, 84; 86, 88; and 90, 92 are also shown formed in the resilient member 12.

The right end of the resilient member 12 has two apertures 94, 96 therein. A suitable connecting means such as the screws 98, 100 which pass through the apertures 94, 96, are employed to threadedly connect the right end of the resilient member 12 to the left end of a movable number 102 which by way of illustration is shown to be the body of a poppet-valve. The movable member 102 in turn has a hook 104 extending therefrom. This hook 104 can be hooked in a non-retractable position to a stationary member such as to a top-front-open end of an instrument casing 106 after the integral front end 108 and the rectangular shaped support plate 110 have been moved to the right of their dotted line position shown in FIGURE 6.

A plate 112 of L-shaped configuration is fixedly attached to the support plate 110 by means of a suitable number of threaded screw retaining means 114. Another retaining means 116 is shown having a rotatable knurled head 118, a shoulder portion 120 in contact with the upper surface of the plate 112, and a threaded portion 122 that extends in a non-engaged condition through an aperture 124 in the plate 112 and a cotter clip 126 and into threaded engagement at 128 with the movable member 102. It can be seen that the poppet-valve body 102 can be fixedly connected in a rapid manner to the L-shaped plate 112 and its associated movable rectangular plate 110 by retaining the body 102 under the L-shaped plate 112 and thereafter applying rotation to the knurled portion 118 of the screw retaining means 116. Disconnection of these parts can be acquired by rotating the screw retaining means 116 in an opposite direction.

The six integral fluid transmitting tubes 14 shown in cross-section in FIG. 3 are made of a unitary one piece molded construction which may be rubber or some other material having similar resilient characteristics.

FIGURE 3 shows a shank 130 of the snap-on retaining clip 20 passing through an aperture 132 formed in the molded connection that extends between two centrally positioned tubes 134, 136 and an aperture 138 formed in the resilient member 12. The right end clip 20 is shown retained in spring tight engagement with the right side surface of the resilient member 12 by means of a cone shaped part 140 of the shank 130. It should be understood that other types of protuberances could be used in lieu of this cone shaped type. It should be noted that the aperture 132 is of a smaller diameter than the cone shaped part 140 so that the cone will be forced through the resilient member 12 when it is assembled.

FIGURE 5 shows additional apertures; e.g. 142, 144, 146 as being formed in the resilient member 12 to accommodate the insertion of the associated snap-on retaining clips 16, 18, 28 in a forced manner therethrough.

The remaining clips 22, 24, 26 are likewise employed to mount other portions of line 14 in a fixed non-crimped secure manner against the resilient member 12 in the same way as previously described for retaining clip 20.

The ends of the six lines 14 shown in FIGURES 1–4 are connected in a fluid tight press fit manner to the terminal connection 148–158 of a movable block 102 as is best shown in FIGURES 1 and 4.

As is best shown in FIGURE 1 and FIGURE 3 a coiled wire 160, 162 is provided along the length of the interior wall of their associated tubes 164, 166 to provide additional assurance that no pinching of these tubes which are not in the immediate vicinity of the retaining clip 20 will occur.

The opposite left ends of each of the six jumper type flexible connector lines 14 shown in FIGURE 1 can be connected to separate terminals, e.g. 168, 170, 172 in the body of a portable portion 174 of a poppet-valve 176 similar to the manner in which the opposite ends are connected to block 102 as shown in FIGURE 4. This portable portion 174 of the flexible type of jumper 10 in turn can be rapidly attached to a stationary portion 178 of another mating body portion of the poppet-valve 174 by means of the threaded connection 180.

FIGURE 3A shows how a snap-on retaining clip 180 can be employed to retain a plurality of integrally molded electrically insulated wires 182 in a non-crimped condition against the resilient member 12. This is accomplished in a manner similar to the way in which the retaining clip 20 retained the fluid connector 14 against this resilient member 12 as previously set forth under the description of FIGURE 3.

FIGURE 3B shows still another modified form of the present invention in which a snap-on button retainer 184, similar to retainer 20 and 180, and a clip 186 is employed to retain portions of four separate transmission lines 188, 190, 192, 194 to various spaced apart portions of the resilient member 12.

Single coil spring wires 196, 198 are shown inserted in their tubes 188, 194 and extend along the entire length of their tubes to provide additional assurance that no pinching of these tubes that are not in the immediate vicinity of the retaining clip 184 will occur.

FIGURE 4A shows how the ends of four separate transmission lines 188, 190, 192, 194 are connected in fluid tight press fit manner to terminal connections 200–206 of a movable block 208 which block may be a type similar to the movable block 102, but with fewer terminal connections thereon.

FIGURE 8 shows a plain view of a modified form of a flexible connector for the left end of the connector shown in FIGURE 2 to indicate how the left end of the connector can be provided with a terminal black 174 and hook attachment 104A connected thereto by the threaded connection 98A so that both ends of the connector shown in FIGURE 2 can be simultaneously moved away or toward one another for connection to any two different relatively spaced apart members.

From the aforementioned description it can be seen that a unique noncrimpable, flexible, connector has been disclosed that has an extensible resilient member and a jumper type fluid and/or electrical type transmission lines that extend along and are interwoven through apertures positioned along the length of the member and which are retained in firm position thereto by means of snap-on retainers.

What is claimed is:
1. An extensible and contractible flexible connector for supporting transmission lines, comprising an extensible-contractible drawbridge type resilient member connected at one end to a supply terminal block and at the other end to a delivery terminal block, said delivery terminal block being movable relative to said supply terminal block, said resilient member containing at least one pair of spaced apart apertures therein, the portion of said resilient member between said apertures comprising a hinge, jumper type transmission lines connected at one end to said supply terminal block and at the other end to said delivery terminal block extending along at least one underside surface portion of said resilient member through one of each pair of apertures, along the outer surface portion of said hinge portion extending between each pair of apertures, through the other remaining one of said pair of apertures and along at least one other underside surface of said resilient member, and separate removable means to connect the transmission lines extending along the underside surface portions of said resilient member in fixed relation therewith and to retain the transmission lines in substantially non-movable fixed relation with the resilient member when the resilient member is extended and contracted through bending of said hinge portion upon movement of said delivery terminal block with respect to said supply terminal block.

2. The flexible connector is defined in claim 1, wherein the outer surface of a removable coil spring extends along and in contact with an inner wall surface of at least one of the transmission lines.

3. The connector as defined in claim 1, wherein the extensible resilient member contains a hinged portion positioned between each pair of apertures formed therein that is of a thinner construction than the remaining part of the resilient member, clips are employed as the retaining means, at each portion of the transmission line that extends along an outer surface portion of the member between each pair of apertures formed therein and which passes over said hinge forms a loop that is of a substantially horseshoe configuration, said clips and each hinge portion formed in the resilient member providing a flexible means about which the looped portion can be flexed without being crimped while the resilient member is moved between different extensible and contractable positions.

4. The connector as defined in claim 1, wherein the retaining means is comprised of snap-on clips each comprising of a button head, a shank extending therefrom, and a protuberance on the end of the shank.

5. The connector as defined in claim 1, wherein each of the retaining means is comprised of a snap-on clip comprised of a button head, a shank extending therefrom, and a protuberance on the end of the shank, and the resilient member is provided with apertures that are of larger size than the shank and smaller size than the protuberance to accommodate the passage of the protuberance in slidable press fit engagement therethrough.

6. The connector as defined in claim 1, wherein each of the retaining means is comprised of a snap-on clip comprised of a button head, a shank extending therefrom, and a cone on the end of the shank.

7. The connector as defined in claim 1, wherein each of the retaining means is comprised of a snap-on clip comprised of a button head, a shank extending therefrom, and a cone on the end of the shank, and the resilient member is provided with apertures that are of larger size than the shank and smaller size than the cone to accommodate the passage of the protuberance in slidable press fit engagement therethrough.

8. The connector as defined in claim 1, wherein the transmission line is comprised of a series of flexible tubes and connecting members extending between each adjacent pair of said tubes, each of the retaining means being comprised of a clip that is of a substantially T-shaped configuration and having a perpendicular portion thereof terminating in a cone, the cone being operable to pass through the resilient member in press fit engagement therewith and into engagement with its opposite side to thereby retain the tubes in said non-movable fixed relation with the resilient member while the resilient member is extended and contracted.

9. The connector as defined in claim 1, each terminal block is adapted to be connected to a different one of two other associated blocks that are positioned in spaced relationship therewith when said terminal blocks are moved away from one another, and means associated with each of the terminal blocks to retain them in said last mentioned position.

10. The connector as defined in claim 1, wherein, each terminal block is adapted to be connected to a different one of two other associated blocks that are positioned in spaced relation therewith when said terminal blocks are moved away from one another, means associated with each of the terminal blocks to retain them in said last mentioned position and wherein each of the retaining means for said terminal blocks is of substantially hook shape configuration.

References Cited

UNITED STATES PATENTS

| | | | |
|---|---|---|---|
| 1,974,160 | 9/1934 | Peirson | 24—208.3 |
| 2,143,649 | 1/1939 | Dansard | 139—384 X |
| 2,170,557 | 8/1939 | Guarnaschelli | 285—114 X |
| 2,865,979 | 12/1958 | Klassen | 191—12 X |
| 2,219,750 | 11/1965 | Davies | 247—177 X |
| 3,272,535 | 9/1966 | Neely | 285—114 |

FOREIGN PATENTS

| | | |
|---|---|---|
| 1,133,779 | 7/1962 | Germany. |
| 1,158,762 | 12/1963 | Germany. |

CARL W. TOMLIN, *Primary Examiner.*

R. G. BERKLEY, *Assistant Examiner.*